US007505965B2

(12) United States Patent
Ivanov

(10) Patent No.: US 7,505,965 B2
(45) Date of Patent: Mar. 17, 2009

(54) SYSTEMS AND METHODS FOR PROVIDING A USER INTERFACE WITH AN AUTOMATIC SEARCH MENU

(75) Inventor: Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 11/045,171

(22) Filed: Jan. 27, 2005

(65) Prior Publication Data

US 2006/0167851 A1    Jul. 27, 2006

(51) Int. Cl.
*G06F 17/30* (2006.01)
(52) U.S. Cl. .............................. 707/3; 715/255; 704/1; 707/101
(58) Field of Classification Search .................. 707/3, 707/100
See application file for complete search history.

(56) References Cited

U.S. PATENT DOCUMENTS

| 5,825,357 | A | 10/1998 | Malamud et al. ............ 345/340 |
| 5,933,599 | A | 8/1999 | Nolan .................... 395/200.48 |
| 6,121,968 | A | 9/2000 | Arcuri et al. ................ 345/352 |
| 6,279,016 | B1 | 8/2001 | De Vorchik et al. ......... 707/526 |
| 6,380,957 | B1 | 4/2002 | Banning |
| 6,484,149 | B1 | 11/2002 | Jammes et al. ................ 705/26 |
| 6,484,190 | B1 * | 11/2002 | Cordes et al. ............... 715/514 |
| 6,741,996 | B1 | 5/2004 | Brechner et al. ............ 707/102 |
| 6,938,038 | B2 * | 8/2005 | Weinberg et al. .............. 707/4 |
| 6,988,095 | B1 * | 1/2006 | Dorfman ....................... 707/3 |
| 2007/0038592 | A1 * | 2/2007 | Haub et al. .................... 707/1 |

FOREIGN PATENT DOCUMENTS

| EP | 0 623 870 | 11/1994 |
| EP | 1 197 885 | 4/2002 |
| EP | 1 380 814 | 1/2004 |
| WO | WO 03/041371 | 5/2003 |

OTHER PUBLICATIONS

Law, S.W. et al., "Representing Lexicons by Modified Trie for Fast Partial String Matching," *Society of Photo-Optical Instrumentation Engineers (SPIE), Character Recognition Technologies*, 1993, 1906, 229-237.

(Continued)

*Primary Examiner*—Jean M Corrielus
*Assistant Examiner*—Noosha Arjomandi
(74) *Attorney, Agent, or Firm*—Woodcock Washburn LLP

(57) ABSTRACT

Systems and methods are provided for a user interface with an automatic search menu. The interface exposes commands to the user as instantly searchable hierarchy. Visually, this is represented as a tree view with an edit box above it. There is no "Search" or "Go" button to press. One second after any character is entered in the edit box, the computer reduces a displayed hierarchy down to only those items that match the keyword entered. Entering another character before one second expires resets the timer. This allows the user to type in as little or as much of the keyword as necessary to reduce the hierarchy to a few items, one of which can then be mouse-clicked. This method scales to large number of commands.

17 Claims, 6 Drawing Sheets

OTHER PUBLICATIONS

Rimvall, M. et al., "GE's Mead User Interface—A Flexible Menu—and Forms-Driven Interface for Engineering Applications," 1989 IEEE Control Systems Society Workshops on Computer-Aided Control System Design, Tampa, Florida, 24-34 (Dec. 16, 1989).

Romagnoli, V., et al., "Man-machine Interaction: A Different Way to Use Menus," MICAD 87. Proceedings of the 6th European Conference on CADCAM and Computer Graphics, Paris, France, 1 27-38 (Feb. 23-27, 1987).

Wong, P.C.S. et al., "Flair—User Interface Dialog Design Tool,"*Computer Graphics*, 16 (3) 87-98 (Jul. 1982).

\* cited by examiner

US 7,505,965 B2

SYSTEMS AND METHODS FOR PROVIDING A USER INTERFACE WITH AN AUTOMATIC SEARCH MENU

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2004, Microsoft Corp.

FIELD OF THE INVENTION

This invention relates to computer user interfaces, and more particularly to searching for and then displaying menu items for selection in a user interface.

BACKGROUND OF THE INVENTION

Humans tend to think in associative terms, so a desire to execute a particular task is more naturally associated with a single keyword rather than a path through menus. It is this need to memorize associations between tasks and paths through menus and other user interface (UI) elements that contributes a great deal to why computers are often hard to use.

There are many commands available to the user at any one time, and currently they are generally organized in hierarchies, which are hard for people to traverse. Generally, to access something in a menu system of a current computing environment, the user must manually (i.e., visually and through making numerous selections though a mouse or keyboard) traverse a tree. Accessing a document requires traversing a directory tree. Accessing a command requires traversing menu tree. There are many things one can do at any given time, and arranging these options in tree has traditionally been a way to make it easier for humans to arrive at a desired command. Humans are not very good at linear searches over long lists, so the hierarchical menu system has offered a user what is effectively a manual tree-based search, which may easily become difficult and time consuming with large hierarchies.

In this regard, there is a need for systems and methods to simplify and speed up access to large number of commands for users of any level.

SUMMARY OF THE INVENTION

In consideration of the above-identified shortcomings of the art, an aspect of the invention provides systems and methods for providing a hierarchical view of menu items. The method comprises searching a hierarchical structure based on entered search criteria and then displaying only a portion of the hierarchical structure. The portion displayed is that portion which is necessary to display only menu items matching the search criteria as they exist in the hierarchical structure.

The associated searching process comprises a user entering in at least one character and then, in a substantially immediate fashion, searching a hierarchical structure based on the at least one character entered. The process of continuing to repeat the searching and displaying acts as the user types in additional characters based on the additional characters is also provided. The user may enter in the at least one character in an edit box above the hierarchical structure to be displayed. Other advantages and features of the invention are described below.

BRIEF DESCRIPTION OF THE DRAWINGS

The systems and methods for providing a user interface with an automatic search menu in accordance with the present invention are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

Figure 5:
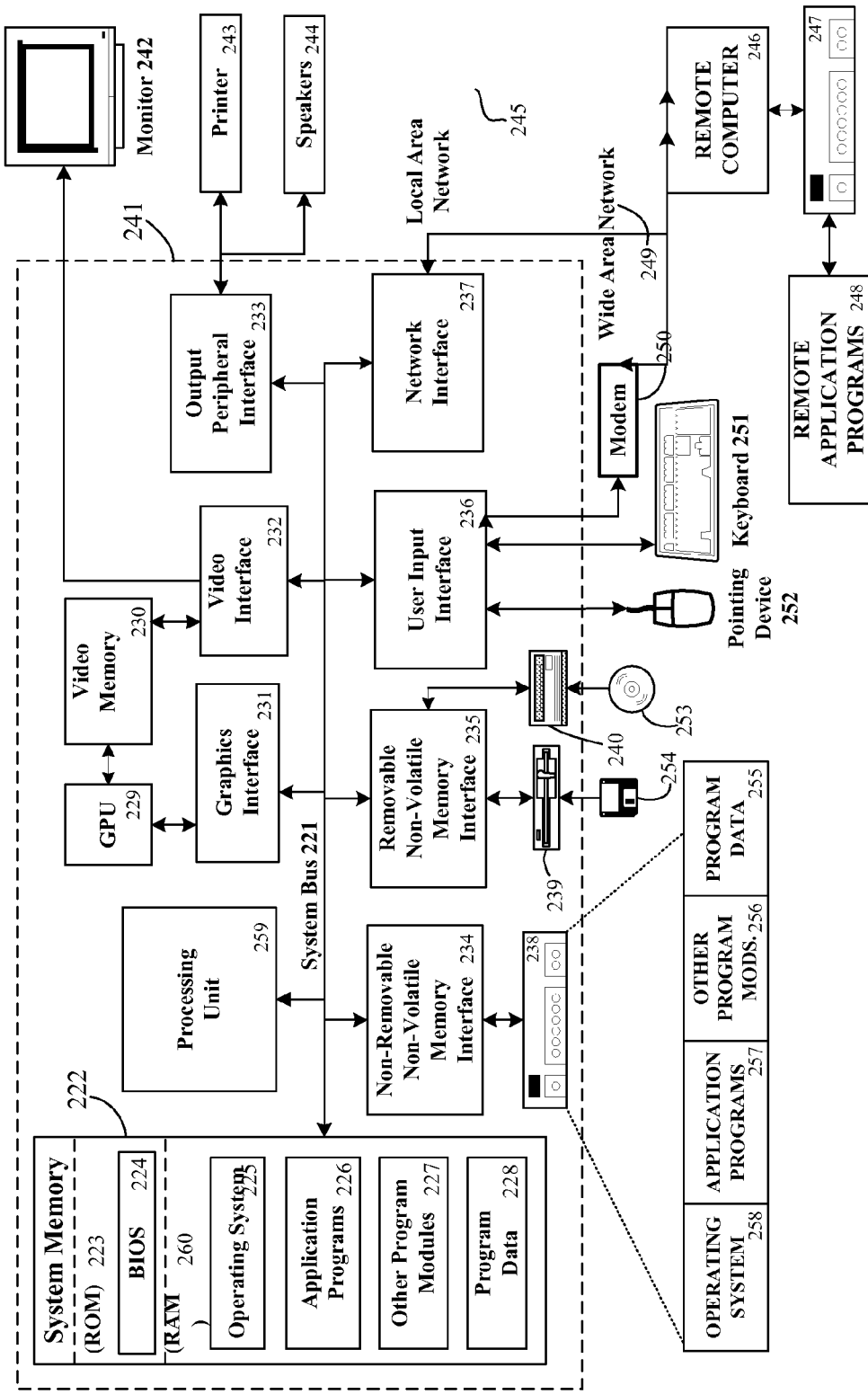
FIG. 5 is a block diagram representing an exemplary computing device suitable for use in conjunction with various aspects of the invention.
Figure 6:
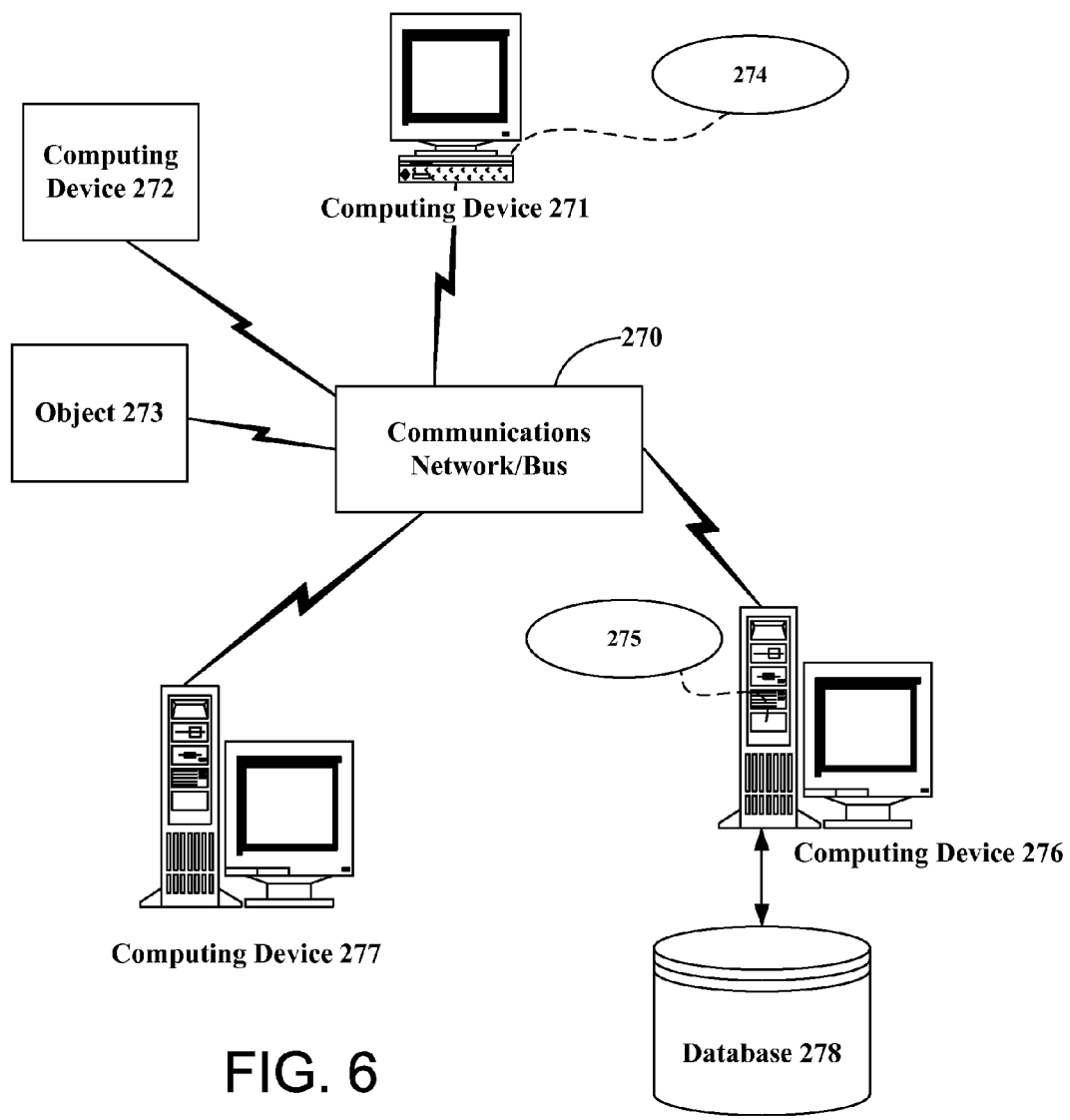
FIG. 6 illustrates an exemplary networked computing environment in which many computerized processes may be implemented.

Systems and methods are described for providing a user interface with an automatic search menu or "Auto Search Menu." Described is an instantly searchable tree view of commands available to a user as a facility for providing fast access to application commands, programs and files. First, an exemplary menu interface will be described having a searchable tree view. Next, processes for creating the tree view for such a menu will be described along with an example implementation using some the commands shown in FIG. 1. Finally, FIGS. 5 and 6 provide a computing and networked environment which will be recognized as generally suitable for use in connection with the systems and methods set forth herein. Because the material in FIGS. 5 and 6 is generally for exemplary purposes, the corresponding description is reserved for the end of this specification, in the section entitled "exemplary computing and network environment."

Menu Interface

Figure 1:
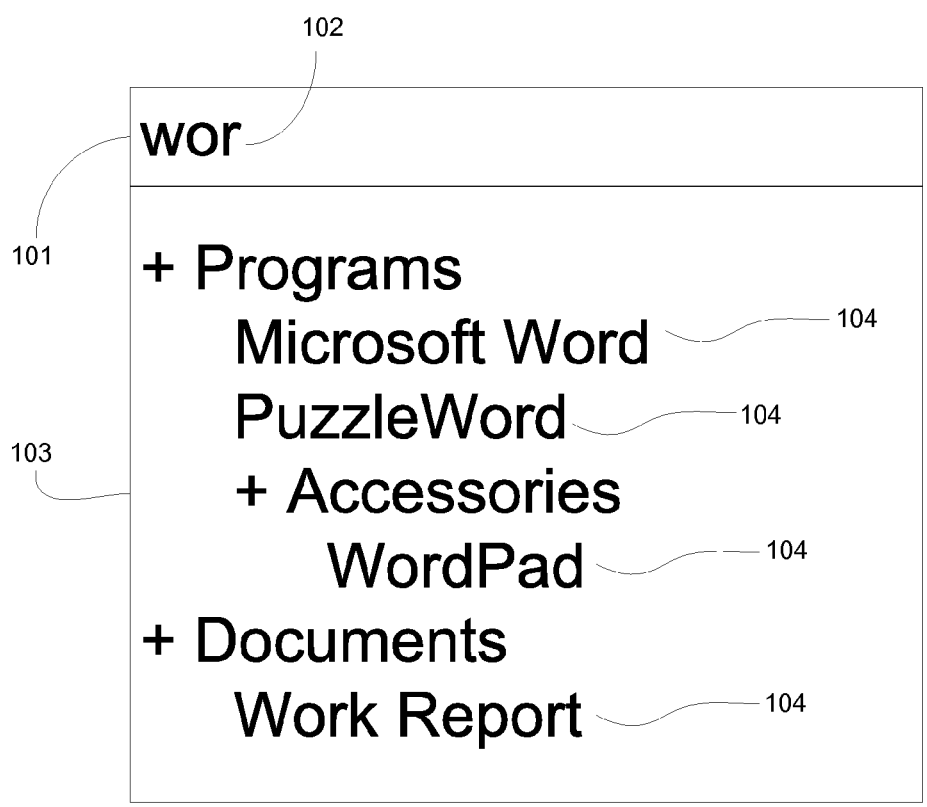
FIG. 1 is a diagram of a graphical user interface menu showing commands in a tree view that were found during an automatic search based on a keyword typed in by a user.

Referring first to FIG. 1, shown is a diagram of a graphical user interface menu showing commands in a tree view that were found during an automatic search based on a keyword typed in by a user. Shown is the edit box 101, the typed keyword 102, and the tree of matches 103 having the matching items 104, which, for example, may be commands 104. The user types in the edit box 101 a keyword or partial keyword 102 and the resulting commands 104 matching that keyword are displayed in the tree of matches 103. The commands 104 are displayed within the same hierarchical structure as they would normally appear, except only those commands 104 in the hierarchy that match the keyword 102 entered are displayed in the tree of matches 103, thus allowing the user to easily find and select the item that he or she was looking for.

Approximately one second after any character is entered in the edit box 101, the displayed hierarchy (i.e., tree of matches 103) is reduced down to only those items 104 that match the keyword 102 entered. This is controlled by a timer. A user entering another character in the edit box 101 before approximately one second expires resets the timer. This allows the user to type in as little or as much of the keyword as necessary to reduce the hierarchy 103 to a few items, one of which may be selected by a mouse-click or the keyboard, for example.

In the present example of FIG. 1, a user has typed in the letters "wor" as the keyword 102 in the edit box 101. Thus, the matches found 104 were those commands which had the string "wor" in the command label. The commands "Microsoft Word®," PuzzleWord®," and "WordPad®" are commands to start their associated software applications and the command "Work Report" is a command to open the associated file named "Work Report." All of these items 104 were identified as matches to be included in the tree of matches 103 because they had the string "wor" in their respective command labels which matched the keyword entered 102.

Alternatively, other information associated with possible items 104 to be displayed in the tree of matches 103 may be used to perform the search in finding matches. For example, the type of command, or the type of software application can be used instead of the command label as it appears in the menu. If the keyword entered is "draw," for example, all the drawing software applications would be displayed. Or, for commands that open files, an author's name could be typed in the edit box, and all the commands to open documents that were written by that author would be displayed in the hierarchy 103. Typically, there is metadata associated with each command or underlying associated object, whether it be a file or an application, that provides additional information about that object which can be utilized in performing a search to match a keyword entered 102.

Figure 2:
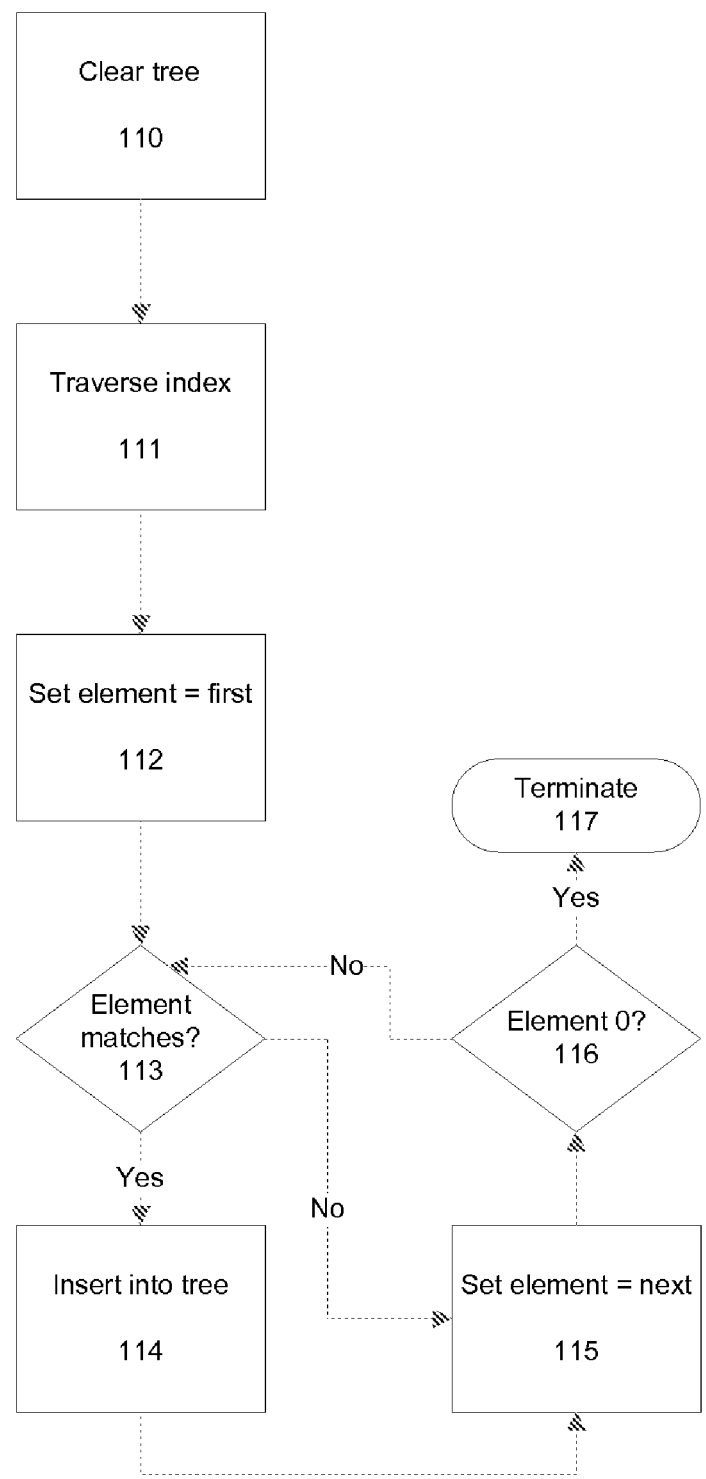
FIG. 2 is a flow chart illustrating a search process for available commands based upon a keyword typed in by a user.

Referring next to FIG. 2, shown is a flow chart illustrating a search process for available commands based upon a keyword typed in by a user in order to create the tree of matches 103 of FIG. 1. First, the tree of matches 110 is cleared to start a new search. The available commands or menu items have been previously indexed in a list that is then traversed 111, item by item, in the search process. The current element is set to the first element or item in the index 112. Then the command name, or other associated information, of the element or item in the list is compared 113 to the keyword entered by the user. If they match, then the element is inserted 114 into the tree of matches 103. If they do not match, the next element is read from the index 115. If the end of the index has been reached (determined by the next element read being null or 0 116), then the search is terminated 117. Otherwise, the search loop continues on to check the next element read from the index 113, adding matches 114 to the tree of matches 103 until the end of the index 116 is reached.

Figure 3:
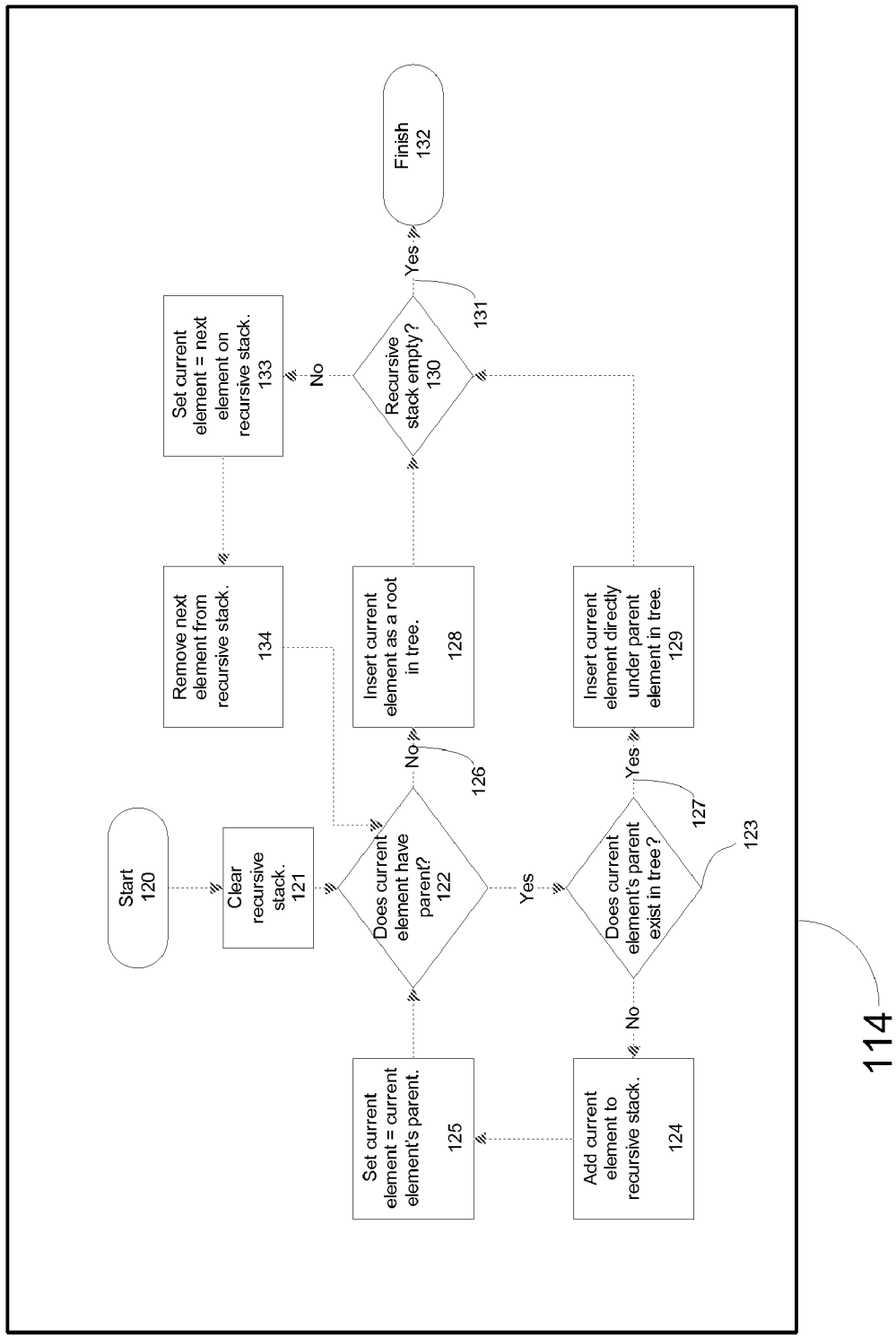
FIG. 3 is a flow chart illustrating a more detailed view of the of the process of FIG. 2 of inserting an element found to match the keyword into a tree as that shown in the menu of FIG. 1.

Referring next to FIG. 3, shown is a flow chart illustrating a more detailed view of the of the process of FIG. 2 of inserting 114 into the tree of matches 103 an element found to match a keyword 101. The principle behind the process of inserting an element into the tree of matches 103, is not just to insert the element itself, but also build the tree of matches to display the element in its place as it exists in the hierarchy of all available commands. To do this, once an element is found in the index, the chain of sub-menus leading down to and including that element must be grafted into the tree of matches 103 to the extent it does not already exist in the tree of matches 103. The following graphical depiction of a recursive process shows one way of performing that function, but other possible variations and methods that give the same result may also be used.

Once a match is found, the process 114 of FIG. 3 is started 120 and the recursive stack in memory is cleared 121. Next, it is determined whether the current element has a parent 122. If so, it is then determined if the current element's parent exists in the tree 123. If not, then a recursive routine is started and the current element is added to a recursive stack 124 in memory. Then, the current element is set to the current element's parent 125 and the loop is continued by again determining whether the now current element has a parent 122.

The above recursive action continues traversing up until either the current element has no parent (i.e., it is a root) 126, or the current element's parent is found to exist 127 in the tree of matches 103 already. At this point, the routine breaks out of the recursive loop and either inserts the current element as a root 128 in the tree of matches 103 (if the current element does not have a parent), or inserts 129 the current element directly under its parent found in the tree of matches 103. Then, it is determined whether the recursive stack is empty 130. If so 131, the process of insertion into the tree 114 is finished 132. Otherwise, the current element is set to the next element on the recursive stack 133 and the next element is removed from the recursive stack 134. The process then continues at the point of determining whether the current element has a parent 122. This loop then continues until the recursive stack is empty 131, thus resulting in all those elements previously put on the recursive stack being inserted below their respective parents 129 in the tree of matches 103.

Figure 4A:
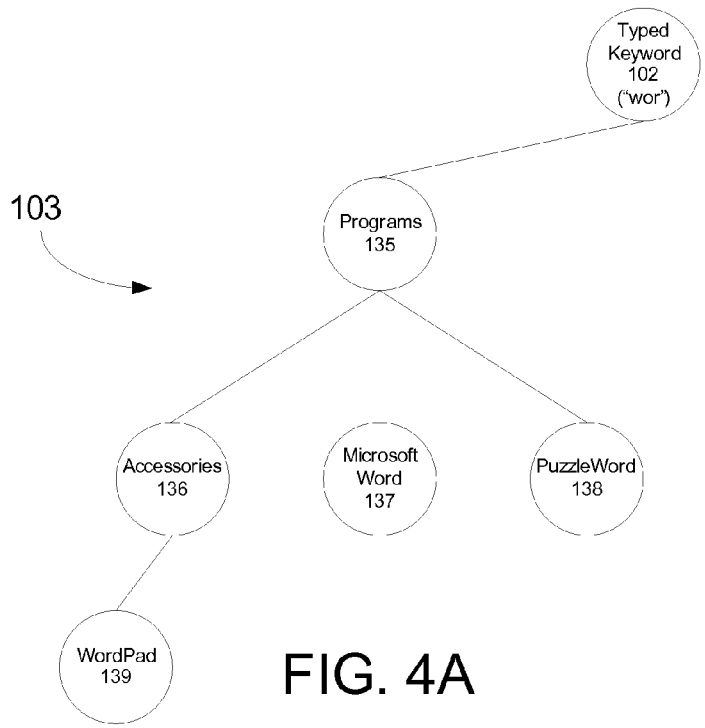
FIG. 4a is a diagram of a tree in the process of being built to display the commands in a tree view as shown in FIG. 1.
Figure 4B:
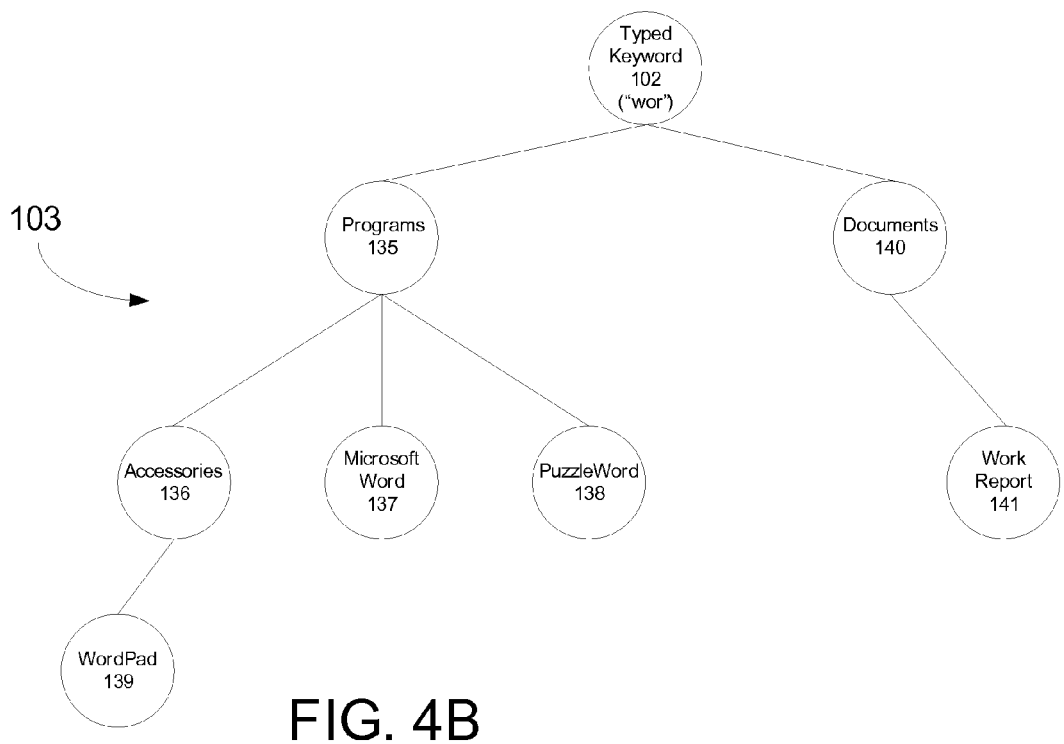
FIG. 4b is a diagram of a completed tree built in order to display the commands in a tree view as shown in FIG. 1.

Referring next to FIGS. 4a and 4b, shown, respectively, are diagrams of an exemplary tree of matches in the process of being built to display the commands in a tree view as shown in FIG. 1 and then that of a complete tree of matches corresponding to the tree view of FIG. 1. Shown is the Programs element 135, below which are the Accessories 136, MICROSOFT WORD® 137, and PUZZLEWORD® 138 elements. Below the Accessories 136 element is the WORD-PAD® 139 element. Also, as shown in FIG. 4b is the completed tree of matches additionally including the Documents 140 element and Work Report element 141 in place. FIG. 4a 103 shows a tree of matches that does not yet have the Documents and Work Report elements in place, but as described in the example below, these elements will be added according to the process of FIG. 3.

First, according to FIG. 2, the element Work Report 141 will be identified as a match 113 due to a user typing in the letters "wor." Then the process of FIG. 3 for inserting the match 114, Work Report 141, into the tree of matches will begin. First, once the recursive stack is cleared 121, it is determined whether the element Work Report has a parent 122. It does, namely the element Documents 140, so it is then determined 123 whether this parent exists in the tree of matches 103. It does not, so the current element, Work Report 141, is added to the recursive stack 125 and then the current element is set to the current element's parent, which is Documents 140. The process then continues on to determine whether Documents has a parent 122. Since it does not have a parent, it is then inserted into the tree of matches 103 as a root element 140 under the Menu root 134. Then, it is determined whether the recursive stack is empty 130. It is not, since the element Work Report 141 was previously added to it. Therefore, the current element is set to the next element on the recursive stack, which is Work Report 141 and is then deleted from the recursive stack 134. The recursive stack is now empty since Work Report 141 was the only element previously added to it.

The process continues on to determine if the current element has a parent. Work Report, the current element, does have a parent which is Documents 140. This time, however, Documents 140 does exist in the tree of matches since it was previously added 128. Thus, when it is checked 123 to see if the current element's parent exists in the tree 103, the process will continue to insert 129 the current element, Work Report 141, under Documents 140 in the tree 103. Since the recursive stack is empty now 131, the process finishes 132 and the tree appears complete as that in FIG. 4b and corresponds to the tree view of FIG. 1. The example above is of inserting a short chain of elements and the same process is of course applicable to longer chains of elements.

Exemplary Computing and Network Environment

Referring to FIG. 5, shown is a block diagram representing an exemplary computing device suitable for use in conjunction with various aspects of the invention. For example, the computer executable instructions that carry out the processes and methods for providing a user interface with an automatic search menu may reside and/or be executed in such a computing environment as shown in FIG. 5. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 5 illustrates operating system 225, application programs 226, other program modules 227, and program data 228.

The computer 241 may also include other removable/non-removable, volatile/nonvolatile computer storage media. By way of example only, FIG. 5 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 5, provide storage of computer readable instructions, data structures, program modules and other data for the computer 241. In FIG. 5, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 5. The logical connections depicted in FIG. 5 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 5 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 6. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 6 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 6, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 6, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 5 and the further diversification that can occur in computing in a network environment such as that of FIG. 6, the systems and methods provided herein cannot be construed as limited in any way to a particular computing architecture. Instead, the invention should not be limited to any single embodiment, but rather should be construed in breadth and scope in accordance with the appended claims.

Conclusion

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly. Likewise, the use of synthetic instructions for purposes other than processor virtualization are also anticipated by the disclosures made herein, and any such utilization of synthetic instructions in contexts other than processor virtualization should be most broadly read into the disclosures made herein.

What is claimed:

1. A computer implemented method comprising a processor for providing a hierarchical view of menu items, said method comprising:
   searching a hierarchical structure based on at least one character of a search word entered by a user, the searching comprising:
      identifying in the hierarchical structure, a first element containing the at least one character; and
      searching the hierarchical structure for a parent element of the first element;
   displaying a first tree of matches that includes if existent, the parent element of the first element, and further includes other elements existing above and below the first element in the first tree of matches;
   displaying the first element as a root element of the first tree of matches if the parent element of the first element does not exist;
   identifying in the hierarchical structure, a second element containing the at least one character;
   searching the hierarchical structure for a parent element of the second element; displaying along with the first tree of matches, a second tree of matches that includes if existent, the parent element of the second element, and further includes other elements existing above and below the second element in the second tree of matches; and
   displaying the second element as a root element of the second tree of matches if the parent element of the second element does not exist.

2. The method of claim 1 farther comprising continuing to repeat the searching and displaying acts as the user types in additional characters based on the additional characters.

3. The method of claim 1 wherein the user enters in the at least one character in an edit box above the hierarchical structure to be displayed.

4. The method of claim 1 further comprising automatically waiting approximately one second before commencing the searching as the user is typing in the at least one character.

5. The method of claim 1 wherein the menu items are commands.

6. The method of claim 1 further comprising selecting one of the displayed menu items with an input device of a computer.

7. A computer readable storage medium having stored thereon instructions for performing a method of providing a hierarchical view of menu items comprising:
   searching a hierarchical structure based on at least one character of a search word entered by a user, the searching comprising:
      identifying in the hierarchical structure, a first element containing the at least one character; and
      searching the hierarchical structure for a parent element of the first element;
   displaying a first tree of matches that includes if existent, the parent element of the first element, and further includes other elements existing above and below the first element in the first tree of matches;
   displaying the first element as a root element of the first tree of matches if the parent element of the first element does not exist;
      identifying in the hierarchical structure, a second element containing the at least one character;
      searching the hierarchical structure for a parent element of the second element;
   displaying along with the first tree of matches, a second tree of matches that includes if existent, the parent element of the second element, and further includes other elements existing above and below the second element in the second tree of matches; and
   displaying the second element as a root element of the second tree of matches if the parent element of the second element does not exist.

8. The computer readable storage medium of claim 7 further comprising instructions stored thereon for continuing to repeat the searching and displaying acts as the user types in additional characters based on the additional characters.

9. The computer readable storage medium of claim 7 wherein the user enters in the at least one character in an edit box above the hierarchical structure to be displayed.

10. The computer readable storage medium of claim 7 further comprising instructions stored thereon for automatically waiting approximately one second before commencing the searching as the user is typing in the at least one character.

11. The computer readable storage medium of claim 7 wherein the menu items are commands.

12. The computer readable storage medium of claim 7 further comprising instructions stored thereon for selecting one of the displayed menu items with an input device of a computer.

13. A system comprising a processor for providing a hierarchical view of menu items comprising:
   means for searching a hierarchical structure based on at least one character of a search word entered by a user;
   means, in operable communications with the searching means, for identifying in the hierarchical structure, a first element containing the at least one character, and for identifying, if existent, a parent element of the first element;
   means for displaying a first tree of matches that includes, if existent, the parent element of the first element, and further includes other elements existing above and below the first element in the first tree of matches;
   means for displaying the first element as a root element of the first tree of matches if the parent element of the first element does not exist;
   means for entering in the at least one character;
   means for, in operable communications with the entering means, for identifying in the hierarchical structure, a second element containing the at least one character, and for identifying, if existent, a parent element of the second element;
   means for displaying along with the first tree of matches, a second tree of matches that includes if existent, the parent element of the second element, and further includes other elements existing above and below the second element in the second tree of matches; and means for displaying the second element as a root element of the second tree of matches if the parent element of the second element does not exist.

14. The system of claim 13 further comprising means, in operable communications with the entering means, for continuing to repeat the searching and displaying acts as the user types in additional characters based on the additional characters.

15. The system of claim 13 further comprising means for the user to enter in the at least one character in an edit box above the hierarchical structure to be displayed.

16. The system of claim 13 further comprising means, in operable communications with the entering means, for automatically waiting approximately one second before commencing the searching as the user is typing in the at least one character.

17. The system of claim 13 wherein the menu items are commands.

* * * * *

UNITED STATES PATENT AND TRADEMARK OFFICE
CERTIFICATE OF CORRECTION

| | |
|---|---|
| PATENT NO. | : 7,505,965 B2 |
| APPLICATION NO. | : 11/045171 |
| DATED | : March 17, 2009 |
| INVENTOR(S) | : Sergei Ivanov |

It is certified that error appears in the above-identified patent and that said Letters Patent is hereby corrected as shown below:

In column 11, line 51, in Claim 2, delete "farther" and insert -- further --, therefor.

Signed and Sealed this
Tenth Day of May, 2011

David J. Kappos
*Director of the United States Patent and Trademark Office*